Feb. 15, 1927.
L. X. CHAMPEAU
1,618,055
DEVICE FOR ARTIFICIAL ILLUMINATION
Filed April 25, 1923    2 Sheets-Sheet 1
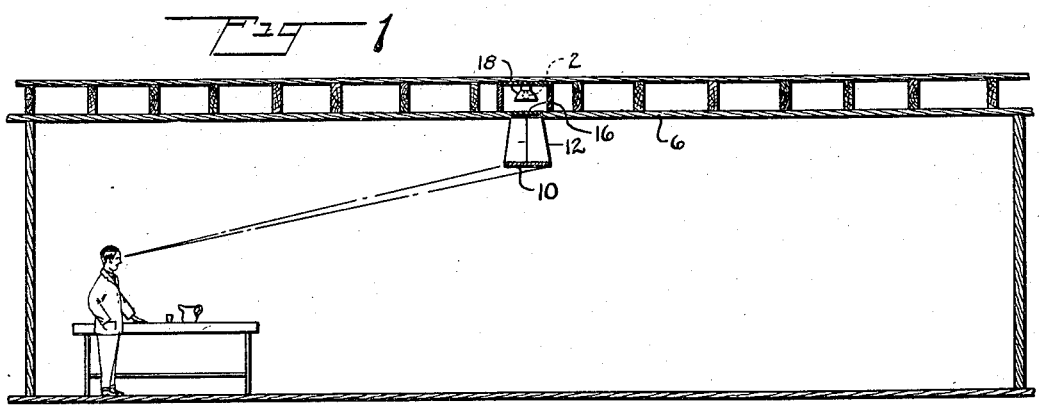
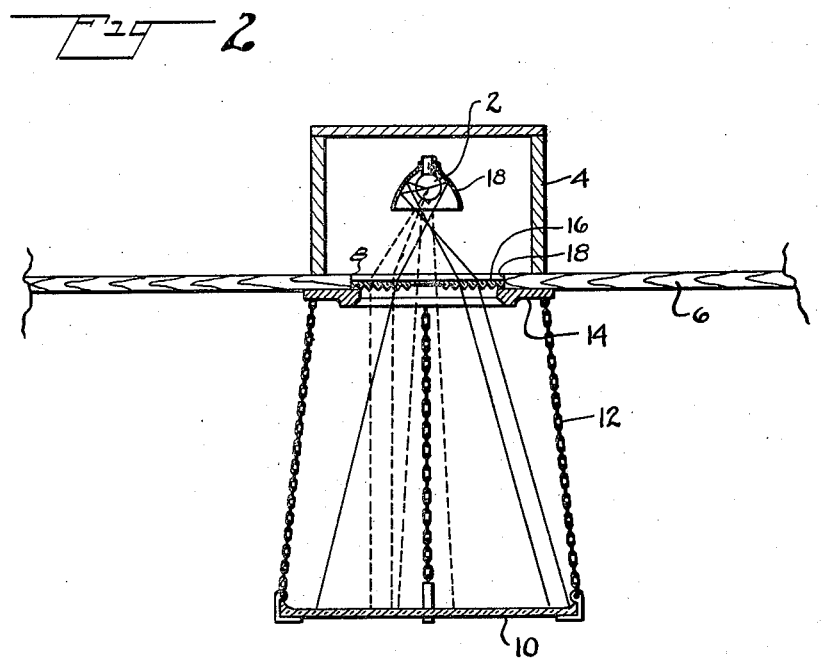
INVENTOR
Laurence X. Champeau
BY Neville & Spencer
ATTORNEY Feb. 15, 1927.
L. X. CHAMPEAU
1,618,055
DEVICE FOR ARTIFICIAL ILLUMINATION
Filed April 25, 1923    2 Sheets-Sheet 2
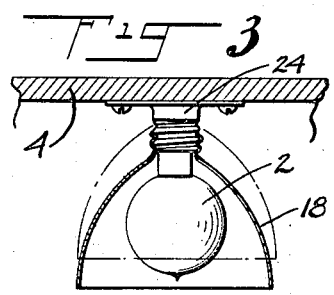
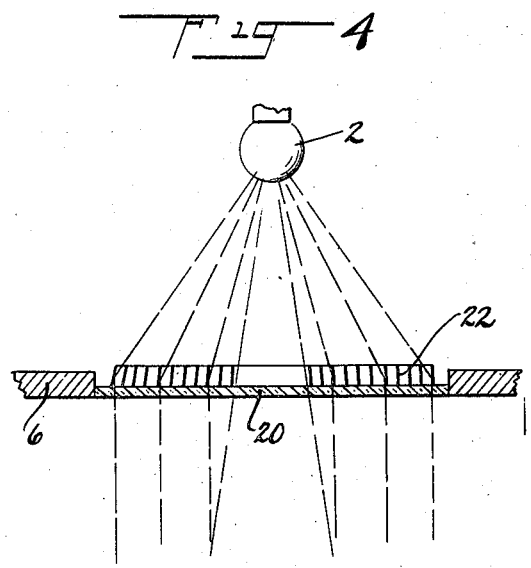
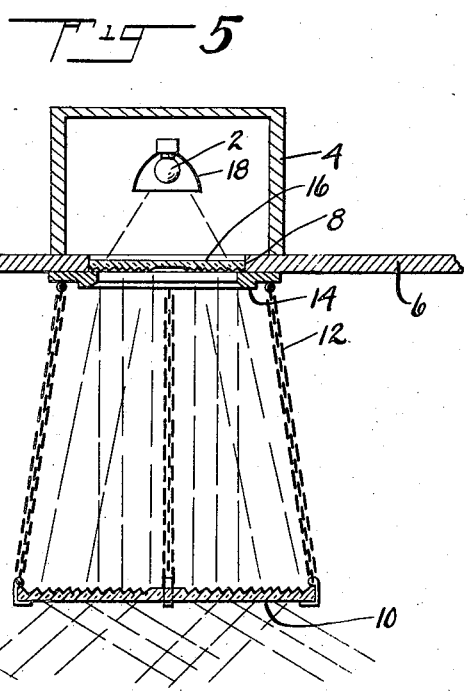
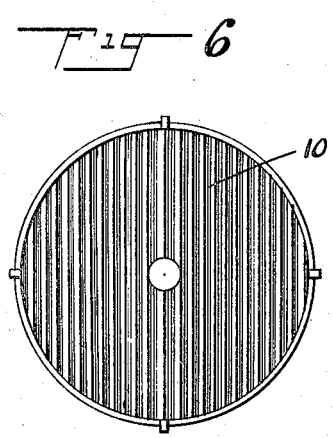
INVENTOR
Laurence X. Champeau
BY Newell & Spencer
ATTORNEYS Patented Feb. 15, 1927.

1,618,055

UNITED STATES PATENT OFFICE.

LAWRENCE X. CHAMPEAU, OF NEW YORK, N. Y., ASSIGNOR, BY MESNE ASSIGNMENTS, TO KIRBY INCORPORATED, A CORPORATION OF NEW YORK.

DEVICE FOR ARTIFICIAL ILLUMINATION.

Application filed April 25, 1923. Serial No. 634,415.

This invention relates to artificial lighting devices, and more particularly to devices for house lighting.

Lighting devices in the usual indirect lighting system consists primarily of a source of light and a translucent light reflecting and transmitting screen interposed between the space to be illuminated and the source of light, the light being transmitted directly from the source of light to the screen. This screen is ordinarily made in the form of a dish or bowl and appears to be the source of illumination. When a translucent bowl shaped screen is employed the relatively strong lateral rays from the screen strike the eye even when the eye is directed horizontally and the glare of light emitted from the screen produces an unpleasant effect upon the eye and interferes considerably with vision. When an opaque screen of this character is employed a considerable part of the light is absorbed in the reflecting operations, thereby reducing the efficiency of the system and the screen appears to be an unsightly dark object in the otherwise brilliantly lighted room.

The principal object of the present invention is to improve the construction and mode of operation of house lighting devices of the indirect lighting type and to produce devices of this character in which the source of illumination is effectively concealed and in which as few as possible of the more direct rays either from the real or the apparent source of illumination shall strike the eye.

With the above object in view a feature of the present invention consists in the provision of a light reflecting and transmitting screen substantially conforming in shape to a plane. This screen is preferably suspended at some distance from the ceiling in the room to be illuminated so that the screen would appear greatly fore-shortened to a person at a distance therefrom looking toward the illuminating devices. With a screen of this character the strong rays passing through the screen will not be transmitted therefrom at a sufficient angle to the screen laterally to reach the eye of a person standing at a distance from the screen. Also from this position a comparatively small illuminating area will be seen by the observer on account of the foreshortening of the screen and when the observer is at a long distance from the screen substantially only the edge of the screen will be seen. Thus the unpleasant glare of light produced by the lateral rays striking the eye in the ordinary system will be practically eliminated.

In accordance with another feature of the invention a light directing and concentrating lens is introduced between the source of light and the diffusing screen. By the use of the light directing and concentrating lens a large part of the light from the source of illumination may be concentrated upon the diffusing screen and the light rays may be directed so that they will not strike the eye before impinging on the screen and the source of illumination may be so arranged that it is effectively concealed. Preferably also a reflector is employed in connection with the source of light so that practically all the rays from the source are projected through the lens.

The invention also comprises certain other novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1 is a view in vertical section of a room with lighting devices embodying the present invention installed in the ceiling;

Figure 2 is a view in vertical section illustrating the lighting devices;

Figure 3 is a detail view in vertical section illustrating particularly the source of light and a reflector associated therewith;

Figure 4 is a detail view in vertical section illustrating particularly a different form of light-directing and concentrating lens from that shown in Fig. 1;

Fig. 5 is a view similar to Fig. 2, illustrating a different form of diffusing screen from that shown in said figure, and Fig. 6 is a plan view of the diffusing screen shown in Fig. 5.

In the form of the invention illustrated in the drawings, a source of light, preferably consisting of an ordinary electric light bulb indicated at 2, is mounted within a casing 4 above the upper wall or ceiling 6 of a room in which the system is installed. Within the ceiling 6 is formed an opening 8 through which the light is projected, and below this opening is hung from the ceiling a light diffusing screen indicated at 10. This screen may be hung upon chains 12 from a ring 14 secured to the ceiling and having an opening registering with the opening 8 in the ceiling. Mounted within the opening 8 is a light-directing and concentrating lens 16 constructed to direct substantially all of the rays received from the source of light upon the diffusing screen 10. In order that substantially all of the rays from the light source may be projected upon the lens, a reflector 18 is mounted in the casing 4 so as partially to surround the source of light and intercept all of the rays transmitted from the light source in a direction out of range of the lens and reflect these rays upon the lens.

The light-directing and concentratig lens 16 is so constructed that substantially all the rays which reach the same from the source of light will be deflected toward the axis of the lens and thereby concentrated within a small area so that they fall upon the diffusing screen. This lens may be of the light refracting type shown in Figs. 1, 2 and 5 in which the lower surfaces of the lens is formed with circularly arranged prismatic ridges or prisms by which the light is refracted, as clearly shown in Fig. 2. In this figure the dotted lines extending from the central part of the electric light bulb illustrate the direction of the light rays passing from this point directly to the lens, and the full lines illustrate the direction of the light rays which pass from the source of light to the reflector and are thereby reflected upon the lens. It will be noted in this figure that substantially all of the rays from the light source either pass directly to the lens or are projected by the reflector upon the lens, and that these rays are all directed by the lens within the margin of the light diffusing screen.

Instead of the prismatic lens shown in Figs. 1, 2 and 5, a lens of the construction shown in Fig. 4 may be employed. In the lens construction shown in this figure, the lens proper, indicated at 20, consists of a section of plate glass and upon the upper face of this glass are mounted a series of light-reflecting rings indicated at 22. These rings preferably consist of strips of highly polished metal mounted on the lens proper and arranged at an oblique angle to the plane of the lens proper, as clearly shown. These rings are arranged sufficiently close together so that substantially all of the rays received from the source of light will strike the inner surfaces of the rings and will be thereby directed upon the light-diffusing screen 10.

The light diffusing screen 10 consists of a transparent or translucent plate conforming substantially to a plane in shape and suspended from the ceiling in the room to be illuminated so that as few as possible of the rays transmitted therethrough will strike the eye. With this form of screen, when a person is standing in the room at a distance from the source of illumination and looking toward the illuminating devices the screen will be greatly foreshortened and will appear as having a comparatively small light transmitting area. As hereinbefore stated, the strong rays passing through the screen will not be transmitted therefrom at a sufficient angle laterally to strike the eye of a person located at a distance from the illuminating devices. Thus the glaring effects and interference with clear vision produced in the ordinary indirect lighting system is almost wholly eliminated. The light diffusing screen may consist of a screen of plate glass having one or more surfaces thereof ground so as to render the same translucent Fig. 2 illustrates a diffusing screen of this character and when constructed in this manner the screen will diffuse the light substantially equally in all directions. The diffusing screen, however, may be varied in construction to suit the requirements of the room in which the lighting devices are installed. Fig. 5 illustrates a diffusing screen in which the upper surface of the screen is formed with a series of parallel prisms extending in straight lines across the screen. When a diffusing screen of this type is employed, the light rays directed by the lens upon the screen will be refracted at oblique angles to the plane of the screen in opposite directions substantially perpendicular to the edges of the prisms, as illustrated diagrammatically in Fig. 5. This form of screen is found to be particularly efficient in lighting long narrow rooms, the screen then being arranged so that the prisms runs crosswise of the room.

In order that the reflector associated with the source of light may project or focus the light in such a manner upon the lens as to produce the best results, the reflector and light source are preferably arranged so that they are relatively adjustable in a direction along the symmetrical axis of the light source and reflector. Fig. 3 of the drawings shows a construction in which such an adjustment may readily be effected. In this construction the reflector 18 is threaded upon screw threads formed on the exterior of the socket 24 in which the light bulb 2 is mounted. This figure shows in full lines the reflector adjusted in one position with relation to the bulb, and in dot-and-dash lines another position of the reflector.

In the lighting system above described, the light is concentrated by the lens upon the diffusing screen 10 and is thereby diffused into the room, with the result that a very even uniform distribution of light is secured. It will be noted that none of the strong rays passing directly from the source of light to the lens, or those passing from the source to the reflector and thereby projected upon the lens can reach the eye of a person sitting or standing in the room in which the lighting devices are installed. The lens is illuminated upon its outer face by the light rays reflected from the screen 10 and will appear merely as a spot which is somewhat lighter than the surrounding ceiling of the room. The screen 10 of course may be located at any desired elevation. The more nearly on the level with the eye the screen is located, the less of the rays transmitted downwardly through the screen will strike the eye. The present system not only eliminates light glare, but also produces a strong evenly diffused light. From any point in the room the lens 16 only appears as a light spot or area in the ceiling. It will also be observed that the construction presents a highly ornamental and attractive appearance.

It will be understood that the invention is not limited to the particular construction and arrangement of parts of the illustrated embodiment of the invention, but that the invention may be embodied in other forms within the scope of the claims.

Having explained the nature and object of the invention and having specifically described a construction embodying the invention in its preferred form, what is claimed is:

1. In combination, a room having a ceiling, a source of light above the ceiling, an opening in the ceiling below the source, and a diffusing screen substantially conforming to a plane in shape suspended below the opening near the eye level of the occupants of the room and in position to conceal the source of light.

2. Lighting devices comprising, in combination, a source of light, a diffusing screen substantially conforming to a plane in shape interposed between the source of light and the space to be illuminated and a light directing and concentrating lens arranged to direct the rays received from said source upon the diffusing screen.

3. Lighting devices comprising, in combination, a source of light, a light collecting reflector associated therewith, a diffusing screen substantially conforming to a plane in shape and a light directing and concentrating lens arranged to direct the rays received from said source upon the diffusing screen.

4. In combination, a room to be illuminated having a ceiling provided with an opening, a primary source of light above the opening, a light diffusing screen below the opening and supported from the ceiling by a plurality of relatively slender members disposed around the opening in such position as to cause substantially all of the light passing from the primary source through the opening to impinge upon the diffusing screen, said diffusing screen thereby constituting a secondary source of illumination.

5. Lighting devices comprising, in combnation, a source of light mounted above the ceiling of a room, a light-diffusing screen substantially conforming to a plane in shape suspended from the ceiling below the source of light, and a light-directing and concentrating lens mounted in an opening in the ceiling and arranged to direct substantially all the rays received from said source of light upon the diffusing screen.

6. In combination, a room to be illuminated having an overhead structure, a source of light, a diffusing screen, three chains depending from the overhead structure to support the screen therebelow, and means for directing upon the screen substantially all that portion of light emanating from the source which enters the room.

Signed at New York city April 16th, 1923.

LAWRENCE X. CHAMPEAU.